US009821407B2

(12) United States Patent
Matsushita et al.

(10) Patent No.: US 9,821,407 B2
(45) Date of Patent: Nov. 21, 2017

(54) FRICTION STIR WELDING METHOD FOR STRUCTURAL STEEL AND METHOD OF MANUFACTURING JOINT FOR STRUCTURAL STEEL

(71) Applicant: JFE Steel Corporation, Tokyo (JP)

(72) Inventors: Muneo Matsushita, Tokyo (JP); Koichi Taniguchi, Tokyo (JP); Rinsei Ikeda, Tokyo (JP)

(73) Assignee: JFE Steel Corporation (JP)

(*) Notice: Subject to any disclaimer, the term of this patent is extended or adjusted under 35 U.S.C. 154(b) by 0 days.

(21) Appl. No.: 15/025,585

(22) PCT Filed: Sep. 10, 2014

(86) PCT No.: PCT/JP2014/004657
§ 371 (c)(1),
(2) Date: Mar. 29, 2016

(87) PCT Pub. No.: WO2015/045299
PCT Pub. Date: Apr. 2, 2015

(65) Prior Publication Data
US 2016/0228981 A1    Aug. 11, 2016

(30) Foreign Application Priority Data

Sep. 30, 2013  (JP) .................................. 2013-205235
Oct. 29, 2013  (JP) .................................. 2013-224540

(51) Int. Cl.
*B23K 20/12* (2006.01)

(52) U.S. Cl.
CPC ........ *B23K 20/1235* (2013.01); *B23K 20/129* (2013.01)

(58) Field of Classification Search
CPC ...................................... B23K 20/122–20/128
USPC ................................................ 228/112.1, 2.1
See application file for complete search history.

(56) References Cited

U.S. PATENT DOCUMENTS

| 4,811,887 | A |   | 3/1989  | King et al. |
|-----------|---|---|---------|-------------|
| 5,460,317 | A |   | 10/1995 | Thomas et al. |
| 5,829,664 | A | * | 11/1998 | Spinella ............. B23K 20/1235 219/78.13 |
| 5,942,314 | A | * | 8/1999  | Fisher .................... B23K 20/10 228/1.1 |

(Continued)

FOREIGN PATENT DOCUMENTS

| CN | 101899630 | 12/2010 |
|----|-----------|---------|
| CN | 102348822 | 2/2012  |

(Continued)

OTHER PUBLICATIONS

Machine translation of JP 2006-021217A (no date available).*

(Continued)

Primary Examiner — Kiley Stoner
(74) Attorney, Agent, or Firm — DLA Piper LLP (US)

(57) ABSTRACT

A process of pre-heating treatment is performed such that steel sheets or plates as working materials are heated by a heating unit provided ahead of a rotational tool moving in a welding direction to precisely control the surface temperature, area, position and the like of a heating region in the process of pre-heating treatment when performing friction stir welding on structural steel.

20 Claims, 4 Drawing Sheets

(56) References Cited

U.S. PATENT DOCUMENTS

| | | | |
|---|---|---|---|
| 6,802,444 B1* | 10/2004 | Petter | B23K 20/123 148/516 |
| 7,980,449 B2* | 7/2011 | Ding | B23K 20/001 228/112.1 |
| 2003/0111515 A1 | 6/2003 | Scheglmann et al. | |
| 2003/0116608 A1* | 6/2003 | Litwinski | B23K 20/1235 228/112.1 |
| 2004/0020970 A1* | 2/2004 | Palm | B23K 20/1235 228/112.1 |
| 2004/0046003 A1* | 3/2004 | Vyas | B23K 20/1235 228/112.1 |
| 2004/0056075 A1* | 3/2004 | Gheorghe | B23K 20/122 228/199 |
| 2005/0224562 A1* | 10/2005 | Prevey | B23K 9/00 228/233.1 |
| 2006/0065698 A1* | 3/2006 | Ishikawa | B23K 20/1265 228/112.1 |
| 2006/0086707 A1* | 4/2006 | Kou | B23K 9/167 219/137 R |
| 2007/0090159 A1* | 4/2007 | Nagano | B23K 37/0435 228/101 |
| 2007/0138239 A1* | 6/2007 | Kumagai | B23K 20/1235 228/227 |
| 2008/0099533 A1* | 5/2008 | Hanlon | B23K 20/122 228/112.1 |
| 2008/0302539 A1* | 12/2008 | Mallenahalli | B23K 20/1225 166/380 |
| 2009/0134203 A1* | 5/2009 | Domec | B23K 20/123 228/112.1 |
| 2009/0261146 A1* | 10/2009 | Hou | B23K 20/122 228/112.1 |
| 2010/0032413 A1* | 2/2010 | Brenner | B23K 9/23 219/75 |
| 2010/0136369 A1* | 6/2010 | Ayer | B23K 20/1225 428/683 |
| 2012/0279271 A1* | 11/2012 | Carter | H05B 6/101 72/342.8 |
| 2012/0298304 A1* | 11/2012 | Kato | B23K 20/1235 156/350 |
| 2012/0328837 A1* | 12/2012 | Goehlich | B23K 20/1255 428/156 |
| 2013/0075452 A1* | 3/2013 | Burford | B23K 20/1255 228/2.1 |
| 2014/0027496 A1* | 1/2014 | Castillo | B23K 20/12 228/102 |
| 2014/0034710 A1 | 2/2014 | Nelson et al. | |
| 2014/0061185 A1* | 3/2014 | Schindele | B23K 20/128 219/617 |
| 2014/0248470 A1* | 9/2014 | Blomqvist | B29C 65/4815 428/188 |
| 2016/0105935 A1* | 4/2016 | Jones | H05B 11/00 219/601 |

FOREIGN PATENT DOCUMENTS

| | | | | |
|---|---|---|---|---|
| CN | 103305750 | | 9/2013 | |
| EP | 1 514 632 A1 | | 4/2004 | |
| JP | 62-183979 A | | 8/1987 | |
| JP | 07-505090 A | | 6/1995 | |
| JP | 2003-094175 A | | 4/2003 | |
| JP | 2003-532542 A | | 11/2003 | |
| JP | 2003-532543 A | | 11/2003 | |
| JP | 2004-504158 A | | 2/2004 | |
| JP | 2004-154790 A | | 6/2004 | |
| JP | 2004-174575 A | | 6/2004 | |
| JP | 2004154790 A | * | 6/2004 | |
| JP | 2004-195480 A | | 7/2004 | |
| JP | 2005-88080 A | | 4/2005 | |
| JP | 2005088080 A | * | 4/2005 | B23K 20/123 |
| JP | 2005-288474 A | | 10/2005 | |
| JP | 2005288474 A | * | 10/2005 | |
| JP | 2006-021217 A | | 1/2006 | |
| JP | 2006-192452 A | | 7/2006 | |
| JP | 2007-185683 A | | 7/2007 | |
| JP | 4313714 B2 | * | 8/2009 | |
| JP | WO 2015045299 A1 | * | 4/2015 | B23K 20/1235 |
| JP | WO 2015045420 A1 | * | 4/2015 | B23K 20/122 |
| JP | WO 2015045421 A1 | * | 4/2015 | B23K 20/122 |
| JP | WO 2016147668 A1 | * | 9/2016 | B23K 20/12 |
| SE | WO 9845080 A1 | * | 10/1998 | B23K 20/126 |
| WO | 2013/081731 | | 6/2013 | |

OTHER PUBLICATIONS

Machine translation of JP 2004-174575A (no date available).*
Extended European Search Report dated Jul. 29, 2016, of corresponding European Application No. 14847434.9.
Office Action dated Jan. 5, 2016 issued by the Japanese Patent Office in corresponding Japanese Patent Application No. 2015-501976 with English translation.
Official Action dated Mar. 31, 2017, of corresponding Korean Application No. 2016-7009119, along with a Concise Statement of Relevance of Office Action in English.
Chinese Office Action dated Jul. 3, 2017, of corresponding Chinese Application No. 201480053753.7, along with a Search Report in English.

* cited by examiner ial Field

FRICTION STIR WELDING METHOD FOR STRUCTURAL STEEL AND METHOD OF MANUFACTURING JOINT FOR STRUCTURAL STEEL

TECHNICAL FIELD

The disclosure relates to a friction stir welding method where welding is performed without adding filler material by inserting a rotational tool into an unwelded portion of working materials, moving the rotational tool while rotating it, and utilizing softening of the working materials caused by the frictional heat generated between the rotational tool and the working materials, and the plastic flow created by stirring the softened portions with the rotational tool. Further, the disclosure particularly addresses plastic flow failure caused by insufficient heating of working materials which is a concern when applying the friction stir welding method to the welding of structural steel, to obtain a sufficient strength and improve welding workability.

In the disclosure, for example, a portion where steel sheets or plates are only butted together and have not been welded yet is referred to as an "unwelded portion," and a portion where steel sheets or plates have been welded and integrated by a plastic flow is referred to as a "welded portion."

BACKGROUND

As a friction stir welding method, JPS62183979A discloses a technique of welding metal materials by rotating both of or one of a pair of metal materials to generate frictional heat in the metal materials to soften the material, and stirring the softened portion to cause a plastic flow.

However, with this technique, since the metal materials which are the subjects to be welded are rotated, the shape and size of the metal materials to be welded are limited.

On the other hand, JPH7505090A proposes a method of continuously welding working materials in a longitudinal direction using the heat and plastic flow generated between the tool and working materials by inserting a tool made of material substantially harder than the working materials into an unwelded portion of working materials and moving the tool while rotating it.

The friction stir welding method described in JP '979 is a method of welding working materials together by rotating the working materials and using frictional heat generated between the working materials. On the other hand, with the friction stir welding method disclosed in JP '090, steel sheets or plates can be welded together by moving the tool while rotating it in a state where the welding members are fixed. Therefore, that technique is advantageous in that continuous solid state bonding can be performed in the longitudinal direction of the members even on members which are substantially infinitely longer in the welding direction. Further, since solid state bonding is performed by utilizing the metal plastic flow caused by the frictional heat generated between the rotational tool and the welding materials, steel sheets or plates can be welded together without melting the portion to be welded. In addition, the technique of JP '090 has many advantages. For example, there is less deformation after welding because of the low heating temperature, there are fewer defects because the welded portion is not melted, and a filler material is not required.

Use of the friction stir welding method is spreading in the fields of aircraft, ships, railway cars, automobiles and the like, as a method of welding low melting point metal materials including aluminum alloy or magnesium alloy. This is because, with these low melting point metal materials, it is difficult to obtain satisfying characteristics in the welded portion by the conventional arc welding method, but it is possible to enhance productivity and obtain welded portions of high quality by applying the friction stir welding method.

On the other hand, by applying a friction stir welding method to structural steels mainly applied as materials for structures such as buildings, ships, heavy machinery, pipelines, automobiles and the like, it is possible to avoid solidification cracking and hydrogen cracking which have been a problem in conventional melt-welding methods and, since the microstructural change of the steel material will be suppressed, excellent joint characteristics are expected. Further, it is also expected that, since purified surfaces are created by stirring the welding interface with a rotational tool and the purified surfaces are contacted to one another, a preparatory step such as diffusion bonding is not required. As described above, many advantages are expected by applying the friction stir welding method to structural steels. However, because of problems regarding welding workability which remain to be solved such as suppression of defect generation at the time of welding or the increase of the welding rate, the friction stir welding method is not as widely used compared to low melting point metal materials.

As described in JP2003532542A and JP2003532543A, high abrasion resistance materials such as polycrystalline cubic boron nitride (PCBN) or silicon nitride ($SiN_4$) are currently used as the rotational tool in friction stir welding of structural steel. However, those ceramics are brittle and, therefore, sheet thickness and processing conditions of the steel sheets or plates to be welded are severely restricted to prevent damages to the rotational tool.

Further, JP200394175A and JP2005288474A disclose, for the purpose of improving welding workability, a welding method including a heating unit other than the frictional heat generated between the rotational tool and the welding materials.

For example, JP '175 discloses a heating device for the friction stir welding method provided with a heating unit using an induction heating device where an increase of the welding rate and the elimination of cracks in the welded portion are sought by heating the working materials before and after the welding thereof.

Further, JP '474 discloses a friction stir welding device provided with a heating unit using a laser device where an increase in the welding rate is sought while suppressing microstructural change around the heating region caused by pre-heating, by partially heating the working materials right before welding is performed.

However, with the techniques of JP '175 and JP '474, the surface temperature, depth or the like of the heating region of the working material heated by the heating before the welding have not been taken into account and, therefore, sufficient welding workability cannot be obtained. Further, there were cases where excessive heating caused a change in the microstructure around the heating region and provided an adverse effect on welding workability, particularly on joint strength. Therefore, in the present circumstances, a practical friction stir welding method to obtain a sufficient strength and improving welding workability has not been discovered.

It could therefore be helpful to advantageously resolve the plastic flow failure caused by insufficient heating of working materials to obtain a sufficient strength and improve welding workability when performing friction stir welding on structural steel.

SUMMARY

We discovered the following:
a) In normal friction stir welding, the only heat source required for welding is the frictional heat generated between the rotational tool and working materials. Therefore, when welding structural steels using the friction stir welding method, the amount of heat required to soften the structural steels as working materials cannot be sufficiently secured. As a result, a sufficient plastic flow cannot be obtained in the portion to be welded, and there is a concern of deterioration in welding workability such as a decrease in the welding rate or generation of welding defects. To avoid deterioration in welding workability which is a very important issue in industrializing the above technique, we believe that the process of pre-heating treatment before friction stir welding is effective.
b) However, if the amount of heat in pre-heating becomes excessive when conducting the process of pre-heating treatment before friction stir welding, there is a problem in that the microstructure around the heating region changes. Particularly with high tension steel sheets or plates strengthened by the martensite structure, even if heating is performed at a temperature of ferrite-austenite transformation temperature or lower, martensite is tempered to cause softening of the area around the heating region and leads to a significant decrease in joint strength.
c) By using a heat source with a high energy density such as a laser, the surface temperature, area and position of the heating region in the process of pre-heating treatment were precisely controlled, and the temperature in the thickness direction of the heating region was appropriately controlled according to need. By doing so, welding workability can be improved without causing deterioration of joint characteristics such as joint strength.
d) Further, with normal friction stir welding, there was a problem in that, because the welded portion is allowed to cool naturally after completing welding, microstructure control by heat history management such as that performed in the rolling process at the time of manufacturing steel materials cannot be applied. However, we discovered that, by performing a process where heating treatment and cooling treatment are combined on the welded portion after completing welding, joint characteristics can further be improved.

We thus provide:
1. A friction stir welding method for structural steel comprising:
    inserting a rotational tool into an unwelded portion of steel sheets or plates, the rotational tool comprising a shoulder and a pin disposed on the shoulder and sharing an axis of rotation with the shoulder, at least the shoulder and pin being made of a material harder than the steel sheets or plates as working materials;
    moving the rotational tool in a welding direction while rotating the tool so that the steel sheets or plates are softened by frictional heat generated between the rotational tool and the steel sheets or plates, and a plastic flow is generated by the softened part being stirred by the rotational tool, and the steel sheets or plates are welded; and
    heating at least one of the steel sheets or plates by a heating unit provided ahead of the rotational tool moving in the welding direction, wherein
    when a part of the steel sheets or plates with a temperature Ts (° C.) of a surface of the steel sheets or plates satisfying $T_S \geq 0.8 \times T_{A1}$, where $T_{A1}$ is represented by the following formula (1), due to the heating is defined as a heating region,
    the minimum distance between the heating region and the rotational tool in the surface of the steel sheets or plates is equal to or smaller than the diameter of the shoulder of the rotational tool,
    the area of the heating region in the surface of the steel sheets or plates is equal to or smaller than the cross-sectional area of a maximum diameter part of the pin of the rotational tool, and
    50% or more of the area of the heating region is positioned between a welding center line and a straight line parallel to the welding center line, the welding center line being a straight line which passes through the axis of rotation of the rotational tool in the surface of the steel sheets or plates and is parallel to the welding direction and the straight line parallel to the welding center line being separated from the welding center line toward an advancing side by a distance corresponding to the maximum radius of the pin of the rotational tool, $$T_{A1}(° C.)=723-10.7[\% Mn]-16.9[\% Ni]+29.1[\% Si]+16.9[\% Cr]+290[\% As]+6.38[\% W] \quad (1)$$

where [% M] represents the content of M element (mass %) in the steel sheets or plates as working materials.

2. The friction stir welding method for structural steel according to aspect 1, wherein when the maximum depth, from the surface of the steel sheets or plates, of a range in which a temperature $T_D$ (° C.) in the thickness direction of the heating region satisfies $T_D \geq 0.8 \times T_{A1}$, where $T_{A1}$ is represented by the following formula (1), is defined as depth D of the heating region, the depth D of the heating region is 30% or more of the thickness t of the steel sheets or plates, $$T_{A1}(° C.)=723-10.7[\% Mn]-16.9[\% Ni]+29.1[\% Si]+16.9[\% Cr]+290[\% As]+6.38[\% W] \quad (1)$$

where [% M] represents the content of M element (mass %) in the steel sheets or plates as working materials.

3. The friction stir welding method for structural steel according to aspect 1 or 2, wherein the heating unit is a laser heating device.

4. The friction stir welding method for structural steel according to any one of aspects 1 to 3, wherein a rear heating unit is disposed behind the rotational tool moving in the welding direction, and the welded portion of the steel sheets or plates is heated by the rear heating unit.

5. The friction stir welding method for structural steel according to aspect 4, wherein a cooling unit is provided in a position behind the rotational tool and behind the rear heating unit, and the welded portion of the steel sheets or plates is cooled by the cooling unit.

6. The friction stir welding method for structural steel according to any one of aspects 1 to 3, wherein a cooling unit is provided behind the rotational tool moving in the welding direction, and the welded portion of the steel sheets or plates is cooled by the cooling unit.
7. The friction stir welding method for structural steel according to aspect 6, wherein a rear heating unit is provided in a position behind the rotational tool moving in the welding direction and behind the cooling unit, and the welded portion of the steel sheets or plates is re-heated by the rear heating unit.
8. A method of manufacturing a joint for structural steel using the friction stir welding method according to any one of aspects 1 to 7.

It is thus possible to advantageously resolve plastic flow failure caused by insufficient heating of the working materials which was conventionally a concern to improve welding workability, and suppress changes in the microstructure to obtain a high joint strength in the welded portion, when performing friction stir welding on structural steel.

REFERENCE SIGNS LIST

Figure 1:
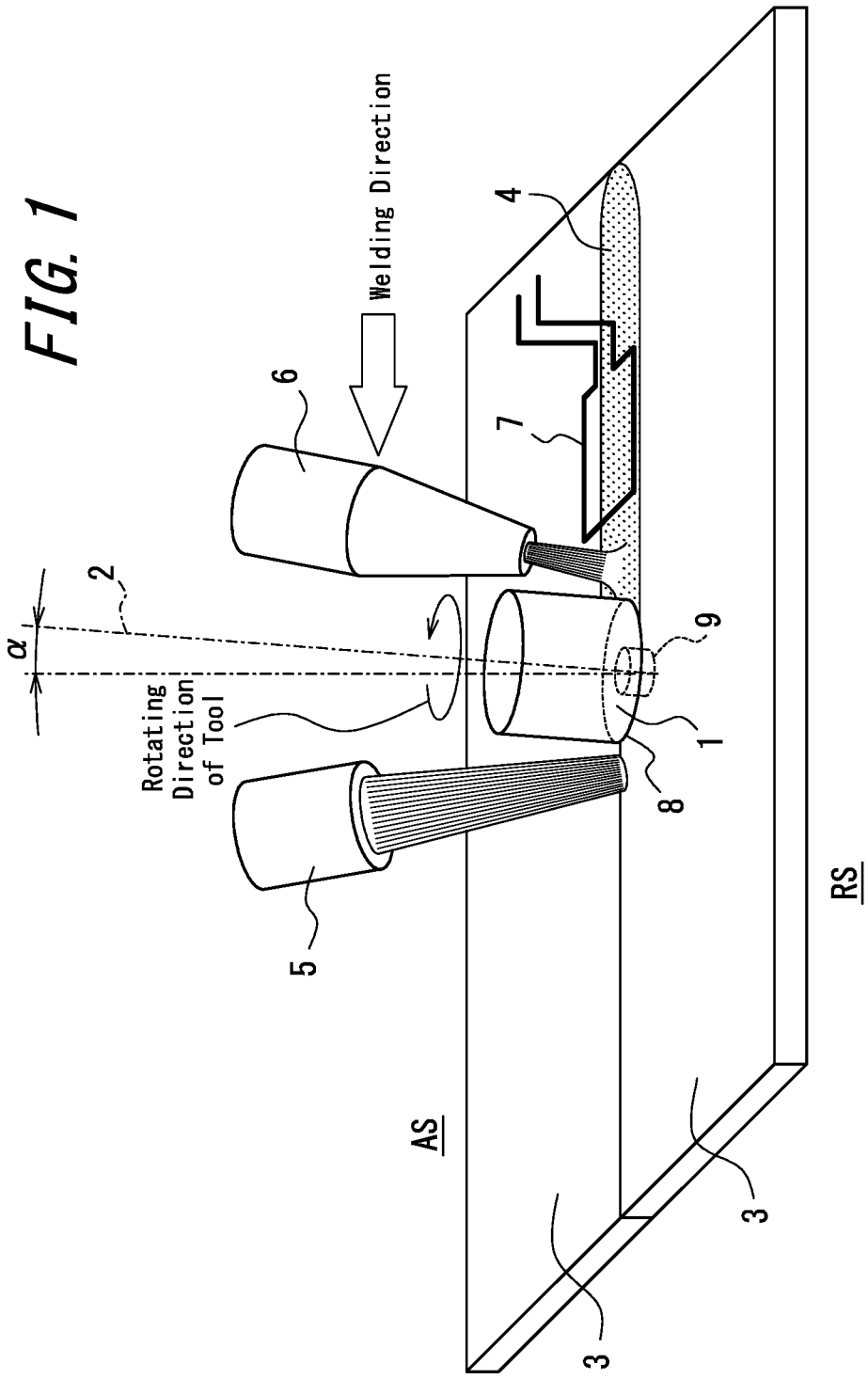
FIG. 1 is a schematic diagram explaining the friction stir welding method described herein.

1 Rotational tool
2 Axis of rotation
3 Steel sheets or plates
4 Welded portion
5 Heating unit
6 Cooling unit
7 Rear heating unit
8 Shoulder of rotational tool
9 Pin of rotational tool
10 Welding center line
11 AS line
12 Heating region
13 Cooling region
14 Re-heating region
a Diameter of shoulder of rotational tool
b Maximum diameter of pin of rotational tool
c Probe length of rotational tool
X Minimum distance between heating region and rotational tool
D Depth of heating region
T Thickness of steel sheets or plates
α Inclination angle of rotational tool

DETAILED DESCRIPTION

Our methods and components will be described in detail below.

The disclosure relates to a friction stir welding method for structural steel, and as shown in FIG. 1, a rotational tool is inserted into an unwelded portion of the steel sheets or plates and moved in the welding direction while being rotated. By performing the above to soften the steel sheets or plates by the frictional heat generated between the rotational tool and the steel sheets or plates, and stirring the softened part with the rotational tool to generate a plastic flow, the steel sheets or plates are welded. The rotational tool comprises a shoulder and a pin disposed on the shoulder and shares the axis of rotation with the shoulder, and at least the shoulder and the pin are formed with material harder than the steel sheets or plates as working materials.

Figure 2:
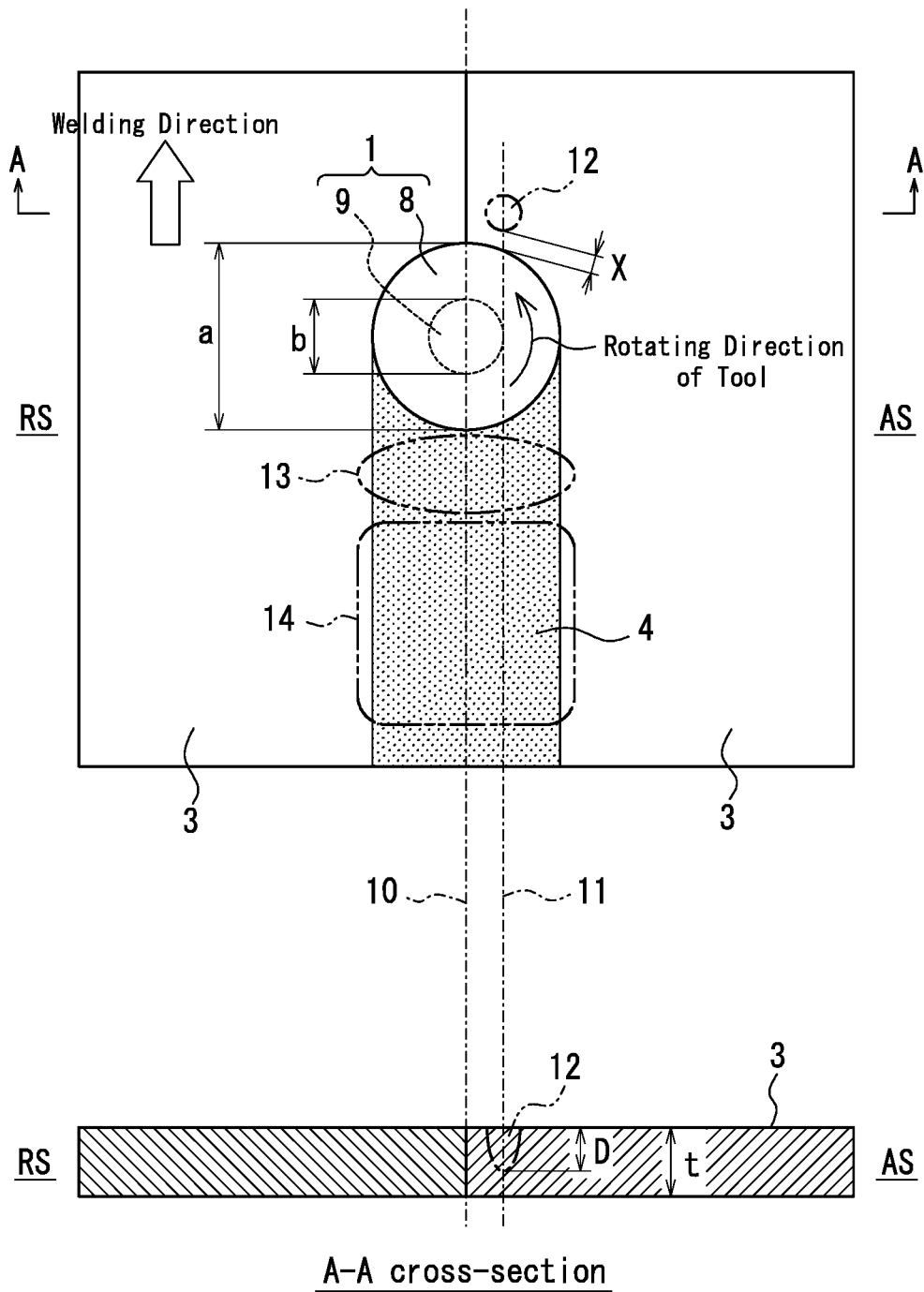
FIG. 2 shows an example of the heating region in the pre-heating process, the cooling region and re-heating region in the process performed after the welding (top view and A-A cross-sectional view).

In FIGS. 1 and 2, reference numeral 1 indicates a rotational tool, reference numeral 2 indicates an axis of rotation, reference numeral 3 indicates steel sheets or plates, reference numeral 4 indicates a welded portion, reference numeral 5 indicates a heating unit, reference numeral 6 indicates a cooling unit, reference numeral 7 indicates a rear heating unit, reference numeral 8 indicates a shoulder of the rotational tool, reference numeral 9 indicates a pin of the rotational tool, and "a" indicates an inclination angle of the rotational tool. Further "AS" and "RS" each indicate the advancing side and the retreating side.

The advancing side is defined as the side where the rotating direction of the tool and the welding direction correspond, and the retreating side is defined as the side where the rotating direction of the tool and the welding direction are opposite to each other.

Further, for the friction stir welding method described herein, the process of pre-heating treatment where steel sheets or plates are heated by a heating unit provided ahead of the rotational tool moving in the welding direction, is important. The process conditions of pre-heating treatment will be explained below with reference to FIG. 2.

Figure 3:
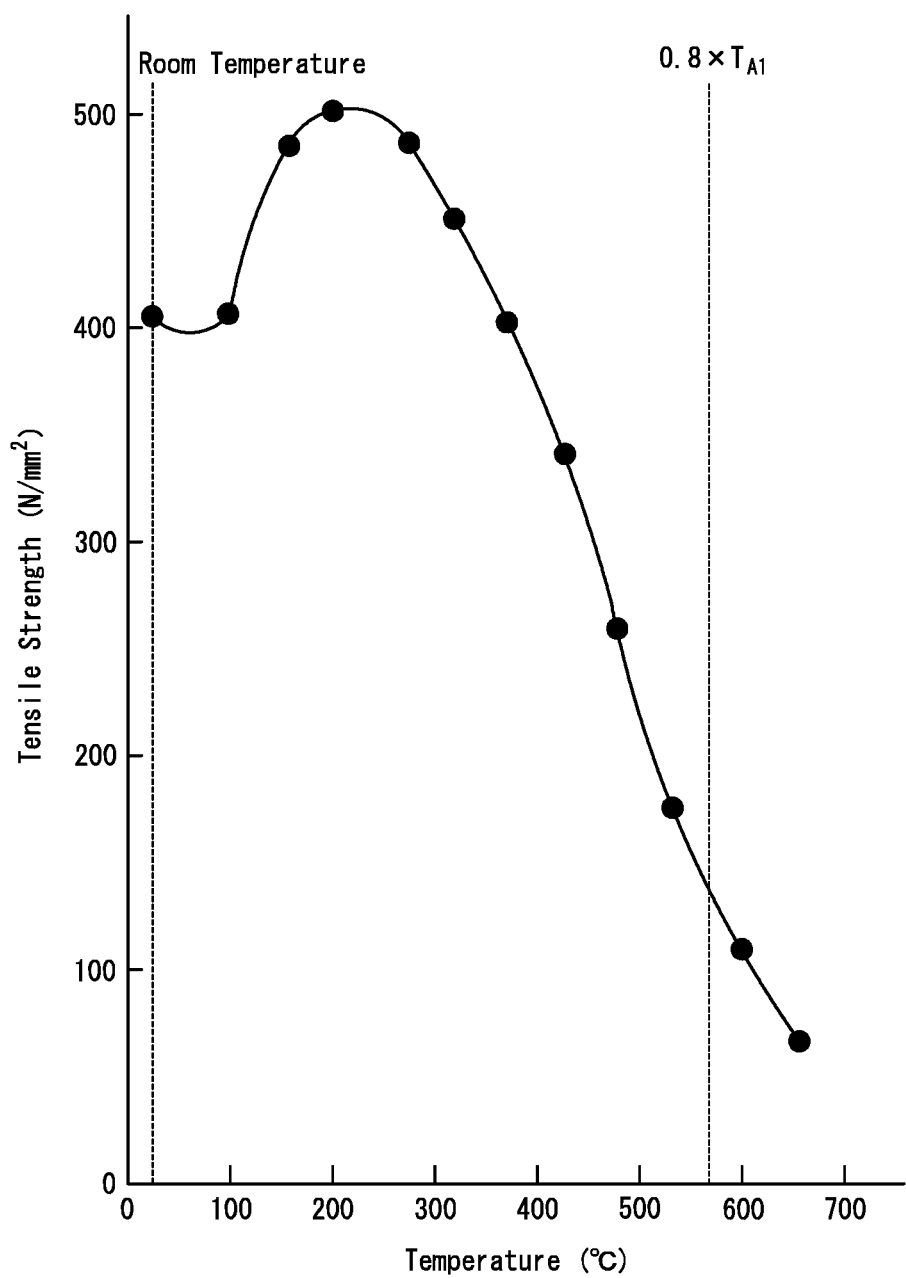
FIG. 3 shows the relation of the temperature and tensile strength of an example of structural steel targeted for the friction stir welding method described herein.

Reference numeral 10 indicates a welding center line, and this welding center line indicates a straight line passing through the axis of rotation of the rotational tool in the surface of the steel sheets or plates and is parallel to the welding direction. Further, reference numeral 11 indicates a straight line parallel to the welding center line and is separated from the line toward the advancing side by a distance corresponding to the maximum radius of the pin of the rotational tool (hereinafter referred to as AS line), reference numeral 12 indicates a heating region, reference numeral 13 indicates a cooling region, reference numeral 14 indicates a re-heating region, "a" indicates the diameter of the shoulder of the rotational tool, "b" indicates the maximum diameter of the pin of the rotational tool, "X" indicates the minimum distance between the heating region and the rotational tool, "D" indicates the depth of the heating region, and "t" indicates the thickness of the steel sheets or plates. Surface temperature $T_S$ of steel sheets or plates in heating region: $T_S \geq 0.8 \times T_{A1}$ As shown in FIG. 3, the steel sheets or plates to be welded by the friction stir welding method described herein normally have strength of around 30% of the strength at room temperature, at a temperature of around 80% of $T_{A1}$ which is the transformation temperature of steel. Further, when exceeding this temperature, the strength further decreases. Therefore, by setting the surface temperature of the steel sheets or plates to $0.8 \times T_{A1}$° C. or higher to previously soften the steel sheets or plates, and stirring the steel sheets or plates to facilitate a plastic flow, the load on the rotational tool can be reduced and the welding rate can be increased. Therefore, the surface temperature $T_S$ (° C.) of the steel sheets or plates in the heating region is $0.8 \times T_{A1}$° C. or higher. Further, $T_{A1}$ (° C.) can be obtained from Formula (1):

$$T_{A1}(° C.)=723-10.7[\% \text{ Mn}]-16.9[\% \text{ Ni}]+29.1[\% \text{ Si}]+16.9[\% \text{ Cr}]+290[\% \text{ As}]+6.38[\% \text{ W}] \quad (1).$$

[% M] is the content of M element (mass %) in the steel sheets or plates as working materials.

However, to sufficiently heat the steel sheet in the thickness direction, there may be a temperature gradient in the surface of the heating region and, in such case, the surface temperature of the steel sheets or plates in the heating region is preferably $1.5 \times T_M$° C. or lower. Further, to avoid damages of the rotational tool and changes in microstructure caused by an excessive increase of the temperature of the welded portion, the surface temperature of the steel sheets or plates in the heating region is preferably lower than $T_M$° C. by the time the steel sheets or plates come into contact with the rotational tool passing through the heating region.

$T_M$ (° C.) is the melting point of the steel sheets or plates as working materials.

Minimum distance between heating region and rotational tool in the surface of steel sheets or plates: equal to or smaller than diameter of shoulder of rotational tool If the distance between the heating region in the surface of the steel sheets or plates and the rotational tool becomes too large, the temperature in the heating region before welding is lowered, and a sufficient effect of pre-heating cannot be obtained. Therefore, the minimum distance between the heating region in the surface of the steel sheets or plates and the rotational tool moving in the welding direction is equal to or smaller than the diameter of the shoulder of the rotational tool.

However, if the distance between the heating region and the rotational tool is too small, the rotational tool may be damaged by the heat from the heating unit, and therefore the minimum distance between the heating region in the surface of the steel sheets or plates and the rotational tool moving in the welding direction is preferably 0.1 times or more of the diameter of the shoulder of the rotational tool.

The diameter of the shoulder of the rotational tool is around 8 mm to 60 mm.

Area of heating region in surface of steel sheets or plates: equal to or smaller than cross-sectional area of maximum diameter part of pin of rotational tool If the heating region becomes too large, the microstructures in the region and the surrounding regions change. Particularly with high tension steel sheets or plates strengthened by the martensite structure, martensite is tempered to cause softening of the steel sheets or plates and leads to a significant decrease in joint strength even if heating is performed at or below the ferrite-austenite transformation temperature. Therefore, the area of the heating region in the surface of the steel sheets or plates is equal to or smaller than the cross-sectional area of a maximum diameter part of the pin of the rotational tool.

On the other hand, if the area of the heating region is too small, a sufficient effect of pre-heating cannot be obtained. Therefore, the area of the heating region in the surface of the steel sheets or plates is preferably 0.1 times or more of the cross-sectional area of the maximum diameter part of the pin of the rotational tool.

The maximum diameter of the pin of the rotational tool is around 2 mm to 50 mm.

Area of heating region in surface of steel sheets or plates, positioned between welding center line and AS line: 50% or more of the area of heating region in surface of steel sheets or plates In friction stir welding of steel sheets or plates, a plastic flow starts on the advancing side, moves along the rotational direction of the rotational tool toward the front side in the welding direction, then toward the retreating side, then passes the rear side in the welding direction, and ends on the advancing side. As described above, the starting point of the plastic flow is on the advancing side. Therefore, when insufficient heating of the steel sheets or plates as working materials easily occurs and an insufficient plastic flow causes defects mostly on the advancing side.

Therefore, by positioning 50% or more of the area of the heating region in the surface of the steel sheets or plates between the welding center line and the AS line which is parallel to the welding center line to preferentially heat the advancing side, it is possible to facilitate the plastic flow, reduce defects, and increase the welding rate. The area is preferably 60% or more of the area of the heating region, and more preferably 80% or more of the area of the heating region. It may also be 100% of the area of the heating region.

Further, from the viewpoint of preferentially heating the advancing side, the center of the heating region is positioned between the straight line passing through the middle point of the welding center line and the AS line, and the AS line. In other words, it is preferable for the center of the heating region to be positioned to the advancing side of the welding center line, and the distance from the center of the heating region to the welding center line to be at least one-half of and at most equal to the maximum radius of the pin of the rotational tool.

Temperature $T_D$ in thickness direction of heating region: $T_D \geq 0.8 \times T_{A1}$ As previously mentioned, steel sheets or plates to be welded by the friction stir welding method described herein normally have strength of around 30% of the strength at room temperature, at a temperature of around 80% of $T_{A1}$ which is the transformation temperature of steel. Further, when exceeding this temperature, the strength further decreases. Therefore, the temperature is $0.8 \times T_{A1}$° C. or higher in the thickness direction of the heating region to previously soften the steel sheets or plates. Further, it is preferable to stir the steel sheets or plates and facilitate the plastic flow to thereby further reduce the load on the rotational tool and further increase the welding rate. Therefore, the temperature $T_D$ in the thickness direction of the heating region specifying the depth D of the heating region, which is described later is defined as $0.8 \times T_{A1}$° C. or higher. $T_{A1}$ (° C.) can be obtained from Formula (1):

$$T_{A1}(° C.)=723-10.7[\% \text{ Mn}]-16.9[\% \text{ Ni}]+29.1[\% \text{ Si}]+16.9[\% \text{ Cr}]+290[\% \text{ As}]+6.38[\% \text{ W}] \quad (1)$$

[% M] represents the content of M element (mass %) in the steel sheets or plates as working materials.

However, to sufficiently heat the steel sheet in the thickness direction, there may be a temperature gradient in the thickness direction of the heating region and, in such case, the temperature of the thickness direction of the steel sheets or plates in the heating region is preferably $1.5 \times T_M$° C. or lower. Further, to avoid damages of the rotational tool and changes in microstructure caused by an excessive increase in the temperature of the welded portion, the temperature of the steel sheets or plates in the thickness direction in the heating region is preferably lower than $T_M$° C. by the time the steel sheets or plates come into contact with the rotational tool passing through the heating region.

$T_M$ (° C.) is the melting point of the steel sheets or plates as working materials. Depth D of heating region: 30% or more of overall thickness of steel sheets or plates The depth D of the heating region is specified by the maximum depth, from the surface of the steel sheets or plates as working materials, of a range in which the temperature $T_D$ in the thickness direction of the above heating region is $0.8 \times T_{A1}$° C. or higher. The depth D of the heating region is preferably 30% or more of the thickness of steel sheets or plates. This is because by setting the depth D of the heating region to 30% or more of the thickness of the steel sheets or plates, the plastic flow is further facilitated. By doing so, it is more advantageous in reducing the load on the rotational tool and increasing the welding rate. More preferably, the depth D is 50% or more of the thickness of the steel sheets or plates.

However, if the depth D of the heating region exceeds 90% of the thickness of the steel sheets or plates, the heating becomes excessive and concerns of changes in the microstructure will arise. Therefore, the depth D of the heating region is preferably 90% or less of the thickness of the steel sheets or plates.

Further, although the heating unit to be used in the process of pre-heating treatment is not particularly limited, a laser heating device is preferably used.

This is because by using a laser having a high energy density as a heat source, the process conditions of pre-heating treatment can be controlled more accurately, and welding workability can be improved without compromising joint characteristics.

Conditions other than the above are not particularly limited, and it would suffice, for example, if the movement rate of the heating unit used in the process of pre-heating treatment is nearly the same as the welding rate. Further, when using a laser heating device as this heating unit, it would suffice to appropriately set the laser output and the beam diameter depending on the welding conditions.

The process of pre-heating treatment in the friction stir welding method described herein is as explained above. In the friction stir welding method described herein, a cooling unit is provided behind the rotational tool moving in the welding direction, and joint strength can be improved by the cooling unit.

This is because, normally, the welded portion is allowed to cool naturally after completing welding and, therefore, sufficient joint strength could not be obtained when the quench hardenability of the steel materials as working materials is low. Regarding this point, strength enhancement by quenching can be achieved by cooling the welded portion of the steel sheets or plates using the cooling unit provided behind the rotational tool moving in the welding direction while appropriately controlling the cooling rate. As a specific cooling unit, cooling by ejecting inert gas is preferable. For example, the cooling rate is preferably 30° C./s to 300° C./s in the range of 800° C. to 500° C.

On the other hand, when quench hardenability of the steel sheets or plates as working materials is high, excessive hardening could occur and cause a decrease in toughness of the joint. Regarding this point, excessive hardening can be suppressed by providing a rear heating unit to heat the rear part near the rotational tool and appropriately controlling the cooling rate to gradually cool the steel sheets or plates. As a specific heating unit, high frequency induction heating or heating performed by using laser as the heat source is preferable. For example, the gradual cooling rate is preferably 10° C./s to 30° C./s at 800° C. to 500° C.

Further, a rear heating unit may be provided in a position behind the rotational tool moving in the welding direction and behind the above described cooling unit, and the welded portion of the steel sheets or plates may be re-heated by the rear heating unit.

By doing so, an increase in hardness can be suppressed when the welded portion is quenched and excessively hardening by the cooling performed by the cooling unit, by performing tempering using the rear heating unit, and the resulting joint may have characteristics providing a desirable balance between strength and toughness. For example, the cooling rate is preferably 30° C./s to 300° C./s at 800° C. to 500° C., and the re-heating temperature is preferably 550° C. to 650° C.

Further, a cooling unit may be provided in a position behind the rotational tool moving in the welding direction and behind the above described rear heating unit, and the welded portion of the steel sheets or plates may be cooled by the cooling unit.

By decreasing the cooling rate with the rear heating unit and then increasing the cooling rate with the cooling unit right after welding, a composite microstructure can be obtained and the resulting joint may have characteristics providing a desirable balance between strength and ductility. For example, the cooling rate is preferably around 10° C./s to 30° C./s at 800° C. to 600° C., and then around 30° C./s to 300° C./s at 600° C. to 400° C.

Regarding the welding conditions other than the above, conventional methods may be followed. However, as the torque of the rotational tool is larger, the plastic flowability of the steel sheets or plates is lower, and defects occur more easily.

Therefore, it is contemplated herein that the rotational speed of the rotational tool is 100 rpm to 1000 rpm to suppress the torque of the rotational tool and increase the welding rate to 1000 mm/min or more.

Further, as the type of steel targeted in the disclosure, general structural steel or carbon steel such as rolled steel material for welded structure of JIS G 3106 and carbon steel for mechanical structure of JIS G 4051 are preferably used. Further, the disclosure can also be advantageously applied to high strength structural steel with tensile strength of 800 MPa or more, and strength of 85% or more, or even 90% or more of the tensile strength of the steel sheet (base material) can be obtained in the welded portion in such case.

Further, according to the method of manufacturing a joint for structural steel using the above friction stir welding method, it is possible to improve welding workability and manufacture a joint for structural steel having high joint strength.

EXAMPLES

Example 1

Figure 4:
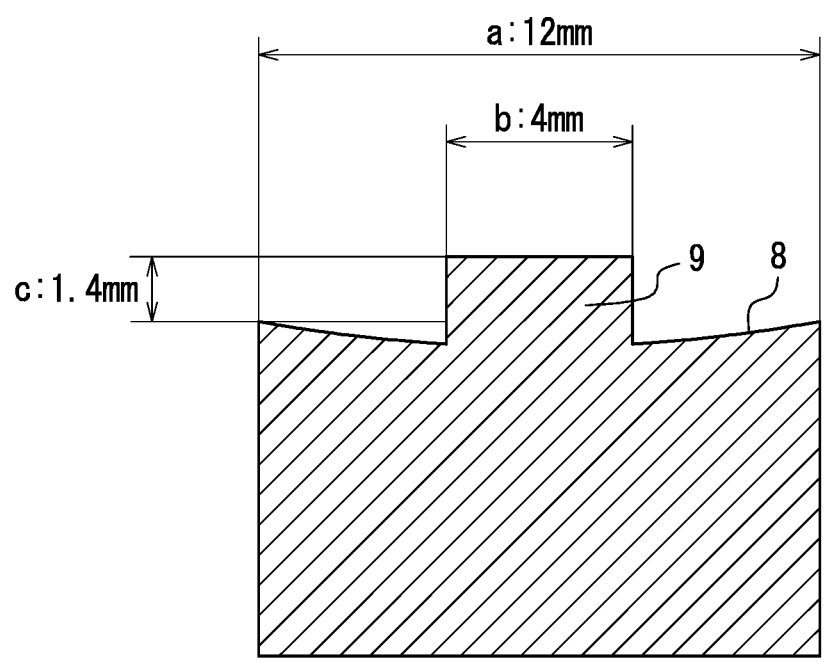
FIG. 4 shows the cross-sectional dimension of the rotational tool used in the examples.

Using steel sheets with sheet thickness of 1.6 mm having the chemical composition and tensile strength shown in Table 1, friction stir welding was performed. The joint butting face of the steel sheets was a non-angled or so-called I type groove, and welding was performed with a one-sided single pass in a surface state as for milling. The welding conditions of friction stir welding are shown in Table 2. Further, a rotational tool (with shoulder diameter a: 12 mm, maximum diameter b of pin: 4 mm, probe length c: 1.4 mm) made of tungsten carbide (WC) with a cross-sectional dimension shown in FIG. 4 was used, and when welding, the portion to be welded was shielded with argon gas to prevent oxidation of the surface.

TABLE 1

| No. | Chemical Composition (mass %) | | | | | Tensile Strength (MPa) | $0.8 \times T_{A1}$ (° C.) |
| --- | --- | --- | --- | --- | --- | --- | --- |
|  | C | Si | Mn | P | S |  |  |
| 1 | 0.3 | 0.21 | 0.69 | 0.012 | 0.003 | 1015 | 577 |
| 2 | 0.16 | 0.07 | 0.69 | 0.016 | 0.009 | 420 | 574 |

TABLE 2

| Inclination Angle of Tool (°) | Tool Rotational Speed (rpm) | Welding Rate (mm/min) |
|---|---|---|
| 3 | 400 | 400 |

Before welding, to confirm the heating region pre-heated using a laser as the heat source, laser beam irradiation was performed under each irradiation condition shown in Table 3 (movement rate of laser, laser output, and beam diameter) on steel sheet 1 of Table 1, and the surface temperature was measured by thermography. Further, the cross-section of the laser irradiated portion was observed, and the microstructure was observed using a nital etching solution.

A range at a temperature of the transformation point ($T_{A1}$° C.) or higher was etched most heavily, and a range existing outside the range where the temperature is lower than the transformation point ($T_{A1}$° C.), but high hardness microstructures such as martensite within the base material are tempered was etched relatively lightly. Therefore, the range at a temperature of the transformation point ($T_{A1}$° C.) or higher, the tempering range at a temperature lower than the transformation point ($T_{A1}$° C.), and the range of the base material are each distinguishable from the others. Further, from the knowledge regarding heat treatment of steel materials, it is known that the tempering range at a temperature lower than the transformation point ($T_{A1}$° C.) corresponds with the range at a temperature of $0.8 \times T_{A1}$° C. or higher and lower than $T_{A1}$° C. By performing such microstructure observation using a nital etching solution, the depth $D_0$ of the range at a temperature of the transformation point ($T_{A1}$° C.) or higher, and the depth (depth D of heating region) of the range at a temperature of $0.8 \times T_{A1}$° C. or higher were measured. The measurement results are shown in Table 4.

TABLE 3

| Irradiation Condition | Movement Rate (mm/min) | Laser Output (kW) | Beam Diameter (mm) |
|---|---|---|---|
| A | 400 | 1.4 | 3.0 |
| B | 400 | 1.4 | 1.8 |
| C | 400 | 0.7 | 4.0 |

TABLE 4

| Irradiation Condition | Shape of Heating Region | Diameter of Heating Region in Steel Sheet Surface (mm) | $D_0$ (mm) | Depth D of Heating Region (mm) |
|---|---|---|---|---|
| A | Circular Shape | 3.5 | 0.28 | 0.30 |
| B | Circular Shape | 2.0 | 0.47 | 0.50 |
| C | Circular Shape | 4.5 | 0.09 | 0.10 |

As shown in Table 4, it can be seen from the measurement results of surface temperature obtained by thermography that, under irradiation condition A, the range at a temperature of $0.8 \times T_{A1}$° C. or higher was a circular shape with a diameter of 3.5 mm. Since the maximum diameter of the pin of the rotational tool used herein is 4.0 mm, the area of the heating region in the steel sheet surface is equal to or smaller than the maximum diameter part of the pin of the rotational tool.

Further, under irradiation condition B, the range at a temperature of $0.8 \times T_{A1}$° C. or higher was a circular shape with a diameter of 2.0 mm. Therefore, similarly to the above, the area of the heating region in the steel sheet surface is equal to or smaller than the cross-sectional area of the maximum diameter part of the pin of the rotational tool.

On the other hand, under irradiation condition C, the range at a temperature of $0.8 \times T_{A1}$° C. or higher was a circular shape with a diameter of 4.5 mm. Since the maximum diameter of the pin of the rotational tool used herein is 4.0 mm, the area of the heating region in the steel sheet surface exceeds the cross-sectional area of the maximum diameter part of the pin of the rotational tool.

As shown in Table 4, it can be seen from the cross-section observation of the laser irradiated portion that, under irradiation condition A, the depth $D_0$ of the range at a temperature of $T_{A1}$° C. or higher and the depth (depth D of heating region) of the range at a temperature of $0.8 \times T_{A1}$° C. or higher were 0.28 mm and 0.30 mm, respectively. Thickness t of the steel sheets as working materials is 1.6 mm, and depth D of the heating region which is the depth of the range at a temperature of $0.8 \times T_{A1}$° C. or higher is approximately 18.8% of thickness t of the steel sheets.

Under irradiation condition B, depth $D_0$ of the range at a temperature of $T_{A1}$° C. or higher and the depth (depth D of the heating region) of the range at a temperature of $0.8 \times T_{A1}$° C. or higher were 0.47 mm and 0.50 mm, respectively. Thickness t of the steel sheets as working materials is 1.6 mm, and depth D of the heating region is approximately 31.3% of thickness t of the steel sheets.

On the other hand, under irradiation condition C, depth $D_0$ of the range at a temperature of $T_{A1}$° C. or higher and the depth (depth D of the heating region) of the range at a temperature of $0.8 \times T_{A1}$° C. or higher were 0.09 mm and 0.10 mm. respectively. Thickness t of the steel sheets as working materials is 1.6 mm, and depth D of the heating region is approximately 6.3% of thickness t of the steel sheets.

Next, the process conditions of the pre-heating by laser irradiation performed before welding the working materials and the process conditions performed after the welding are shown in Table 5. In the process after the welding, cooling was performed by gas injection, and heating (and re-heating) was performed by induction heating.

The indication of "-" in process conditions of pre-heating and process conditions performed after the welding in Table 5 each indicate that the pre-heating process and the process after the welding such as cooling and heating were not performed. Further, the indications of "(AS)" and "(RS)" in the distance from the welding center line to the center of the heating region indicate whether the center of the heating region is positioned to the advancing side of the welding center line or to the retreating side of the welding center line.

TABLE 5

| | Steel Sheet Sample | Laser Irradiation Condition | Process Conditions of Pre-heating | | | | Process Conditions Performed after Welding | | |
|---|---|---|---|---|---|---|---|---|---|
| | | | Minimum Distance X between Heating Region and Rotary Tool (mm) | Distance from Welding Center Line to Center of Heating Region (mm) | Ratio of Area of Heating Region Positioned between Welding Center Line and AS Line (%) | | Additional Process | Cooling (Gradual Cooling) Rate (° C./s) | Re-heating Temperature (° C.) |
| Example 1 | 1 | A | 1 | 1.0 (AS) | 50 or more | 70 | — | — | — |
| Example 2 | 1 | B | 1 | 0.5 (AS) | 50 or more | 80 | — | — | — |
| Example 3 | 1 | B | 1 | 1.0 (AS) | 50 or more | 100 | — | — | — |
| Example 4 | 1 | B | 1 | 1.8 (AS) | 50 or more | 63 | — | — | — |
| Example 5 | 1 | B | 3 | 1.8 (AS) | 50 or more | 63 | — | — | — |
| Example 6 | 1 | B | 1 | 1.8 (AS) | 50 or more | 63 | Cooling and then Re-heating | 250*1 | 600 |
| Example 7 | 1 | B | 3 | 1.8 (AS) | 50 or more | 63 | Cooling and then Re-heating | 250*1 | 600 |
| Example 8 | 2 | B | 3 | 1.8 (AS) | 50 or more | 63 | Only Cooling | 100*1 | — |
| Example 9 | 1 | B | 3 | 1.8 (AS) | 50 or more | 63 | Only Heating | 10*1 | — |
| Example 10 | 1 | B | 3 | 1.8 (AS) | 50 or more | 63 | Heating and then Cooling | 10*2 and then 100*3 | — |
| Comparative Example 1 | 1 | — | — | — | — | — | — | — | — |
| Comparative Example 2 | 1 | B | 13 | 1.8 (AS) | 50 or more | 63 | — | — | — |
| Comparative Example 3 | 1 | B | 1 | 2.3 (AS) | 50 or less | 31 | — | — | — |
| Comparative Example 4 | 1 | B | 1 | 1.8 (RS) | 50 or less | 0 | — | — | — |
| Comparative Example 5 | 1 | C | 1 | 2.3 (AS) | 50 or less | 42 | — | — | — |

*1 Cooling Rate from 800° C. to 500° C.
*2 Cooling Rate from 800° C. to 600° C.
*3 Cooling Rate from 600° C. to 400° C.

Further, Table 6 shows the measurements of the torque of the rotational tool of when performing the welding, and the tensile strength obtained by conducting tensile tests on tensile test specimens of the size of #1 specimen specified by JIS Z 3121 which were collected from the obtained joint.

As the torque of the rotational tool is larger, the plastic flowability is lower, and defects occur more easily.

TABLE 6

| | Torque of Rotational Tool (N · m) | Tensile Strength (MPa) |
|---|---|---|
| Example 1 | 75 | 918 |
| Example 2 | 68 | 920 |
| Example 3 | 60 | 916 |
| Example 4 | 53 | 931 |
| Example 5 | 72 | 911 |
| Example 6 | 52 | 1010 |
| Example 7 | 71 | 1012 |
| Example 8 | 70 | 418 |
| Example 9 | 72 | 950 |
| Example 10 | 71 | 975 |
| Comparative Example 1 | 90 | 919 |
| Comparative Example 2 | 88 | 914 |
| Comparative Example 3 | 82 | 905 |
| Comparative Example 4 | 87 | 918 |
| Comparative Example 5 | 85 | 921 |

Table 6 shows that, in Examples 1 to 10, even when the welding rate is increased, strength of 85% or more of the tensile strength of the steel sheets which are the base materials was obtained, and the torque of the rotational tool was 75 N·m or less, and good plastic flowability was obtained. Particularly, in Examples 6 and 7 where cooling and re-heating were performed after the welding, strength of 99% or more of the tensile strength of the base material was obtained.

On the other hand, in Comparative Examples 1 to 5, the torque of the rotational tool was 80 N·m or more and the plastic flowability was poor.

Example 2

Similar to Example 1, using steel sheets with a sheet thickness of 1.6 mm having the chemical composition and tensile strength shown in Table 1, friction stir welding was performed with a one-sided single pass in a surface state as for milling, on a non-angled or so-called I type groove in the joint butting face. The welding conditions of friction stir welding are shown in Table 7. Similar to Example 1, a rotational tool (with shoulder diameter a: 12 mm, maximum diameter b of pin: 4 mm, probe length c: 1.4 mm) made of tungsten carbide (WC) with a cross-sectional dimension shown in FIG. 4 was used, and when welding, the part to be welded was shielded with argon gas to prevent oxidation of the surface.

TABLE 7

| Inclination Angle of Tool (°) | Tool Rotational Speed (rpm) | Welding Rate (mm/min) |
|---|---|---|
| 3 | 600 | 1000 |

Further, before welding, to confirm the heating region pre-heated using laser as the heat source, laser beam irradiation was performed under each irradiation condition shown in Table 8 (movement rate of laser, laser output, and beam diameter) on steel sheet 1 of Table 1, and the surface temperature was measured by thermography. Further, the cross-section of the laser irradiated portion was observed and, similar to Example 1, the microstructure was observed using a nital etching solution, and the depth $D_0$ of the range at a temperature of the transformation point ($T_{A1}$° C.) or higher and the depth (depth D of heating region) of the range at a temperature of $0.8 \times T_{A1}$ or higher were measured.

The measurement results are shown in Table 9.

TABLE 8

| Irradiation Condition | Movement Rate (mm/min) | Laser Output (kW) | Beam Diameter (mm) |
|---|---|---|---|
| D | 1000 | 3.5 | 3.0 |
| E | 1000 | 3.5 | 1.8 |
| F | 1000 | 1.8 | 4.0 |

TABLE 9

| Irradiation Condition | Shape of Heating Region | Major Diameter of Heating Region in Steel Sheet Surface (mm) | Minor Diameter of Heating Region in Steel Sheet Surface (mm) | $D_0$ (mm) | Depth D of Heating Region (mm) |
|---|---|---|---|---|---|
| D | Elliptical | 3.8 | 3.2 | 0.30 | 0.32 |
| E | Elliptical | 2.2 | 1.8 | 0.51 | 0.54 |
| F | Elliptical | 4.9 | 4.1 | 0.10 | 0.11 |

As shown in Table 9, it can be seen from the measurement results of surface temperature obtained by thermography that, under irradiation condition D, the range at a temperature of $0.8 \times T_{A1}$° C. or higher had an elliptical shape with a major diameter in the direction of laser movement and a minor diameter in a direction orthogonal to the direction of laser movement, and the major diameter was 3.8 mm and the minor diameter was 3.2 mm. Since the maximum diameter of the pin of the rotational tool used herein is 4.0 mm, the area of the heating region in the steel sheet surface is equal to or smaller than the maximum diameter part of the pin of the rotational tool.

Further, under irradiation condition E, the range at a temperature of $0.8 \times T_{A1}$° C. or higher had an elliptical shape with a major diameter in the direction of laser movement and a minor diameter in a direction orthogonal to the direction of laser movement, and the major diameter was 2.2 mm and the minor diameter was 1.8 mm. Therefore, similar to the above, the area of the heating region in the steel sheet surface is equal to or smaller than the cross-sectional area of the maximum diameter part of the pin of the rotational tool.

On the other hand, under irradiation condition F, the range at a temperature of $0.8 \times T_{A1}$° C. or higher had an elliptical shape with a major diameter in the direction of laser movement and a minor diameter in a direction orthogonal to the direction of laser movement, and the major diameter was 4.9 mm and the minor diameter was 4.1 mm. Since the maximum diameter of the pin of the rotational tool used herein is 4.0 mm, the area of the heating region in the steel sheet surface is larger than the cross-sectional area of the maximum diameter part of the pin of the rotational tool.

As shown in FIG. 9, it can be seen from the cross-section observation of the laser irradiated portion that, under irradiation condition D, depth $D_0$ of the range at a temperature of $T_{A1}$° C. or higher and the depth (depth D of heating region) of the range at a temperature of $0.8 \times T_{A1}$° C. or higher were 0.30 mm and 0.32 mm, respectively. Thickness t of the steel sheets as working materials is 1.6 mm, and depth D of the heating region which is the depth of the range at a temperature of $0.8 \times T_{A1}$° C. or higher is approximately 20.0% of thickness t of the steel sheets.

Under irradiation condition E, depth $D_0$ of the range at a temperature of $T_{A1}$° C. or higher and the depth (depth D of the heating region) of the range at a temperature of $0.8 \times T_{A1}$° C. or higher were 0.51 mm and 0.54 mm, respectively. Thickness t of the steel sheets as working materials is 1.6 mm, and depth D of the heating region is approximately 33.8% of the thickness t of the steel sheets.

On the other hand, under irradiation condition F, depth $D_0$ of the range at a temperature of $T_{A1}$° C. or higher and the depth (depth D of the heating region) of the range at a temperature of $0.8 \times T_{A1}$° C. or higher were 0.10 mm and 0.11 mm respectively. Thickness t of the steel sheets as working materials is 1.6 mm, and depth D of the heating region is approximately 6.9% of the thickness t of the steel sheets.

Next, the process conditions of the pre-heating by laser irradiation performed before welding the working materials and the process conditions performed after the welding are shown in Table 10. In the process after welding, cooling was performed by gas injection, and heating (and re-heating) was performed by induction heating.

The indication of "-" in process conditions of pre-heating and process conditions performed after welding in Table 10 each indicate that the pre-heating process and the process after the welding such as cooling and heating were not performed. Further, the indications of "(AS)" and "(RS)" in the distance from the welding center line to the center of the heating region indicate whether the center of the heating region is positioned to the advancing side of the welding center line or to the retreating side from the welding center line.

TABLE 10

| | Steel Sheet Sample | Laser Irradiation Condition | Process Conditions of Pre-heating | | | Process Conditions Performed after Welding | | |
|---|---|---|---|---|---|---|---|---|
| | | | Minimum Distance X between Heating Region and Rotary Tool (mm) | Distance from Welding Center Line to Center of Heating Region (mm) | Ratio of Area of Heating Region Positioned between Welding Center Line and AS Line (%) | Additional Process | Cooling (Gradual Cooling) Rate (° C./s) | Re-heating Temperature (° C.) |
| Example 11 | 1 | D | 1 | 1.0 (AS) | 50 or more 75 | — | — | — |
| Example 12 | 1 | E | 1 | 0.5 (AS) | 50 or more 85 | — | — | — |
| Example 13 | 1 | E | 1 | 1.0 (AS) | 50 or more 100 | — | — | — |
| Example 14 | 1 | E | 1 | 1.8 (AS) | 50 or more 65 | — | — | — |
| Example 15 | 1 | E | 3 | 1.8 (AS) | 50 or more 65 | — | — | — |
| Example 16 | 1 | E | 1 | 1.8 (AS) | 50 or more 65 | Cooling and then Re-heating | 300*[1] | 600 |
| Example 17 | 1 | E | 3 | 1.8 (AS) | 50 or more 65 | Cooling and then Re-heating | 300*[1] | 600 |
| Example 18 | 2 | E | 3 | 1.8 (AS) | 50 or more 65 | Only Cooling | 150*[1] | — |
| Example 19 | 1 | E | 3 | 1.8 (AS) | 50 or more 65 | Only Heating | 30*[1] | — |
| Example 20 | 1 | E | 3 | 1.8 (AS) | 50 or more 65 | Heating and then Cooling | 30*[2] and then 150*[3] | — |
| Comparative Example 6 | 1 | — | — | — | — | — | — | — |
| Comparative Example 7 | 1 | E | 13 | 1.8 (AS) | 50 or more 65 | — | — | — |
| Comparative Example 8 | 1 | E | 1 | 2.3 (AS) | 50 or less 28 | — | — | — |
| Comparative Example 9 | 1 | E | 1 | 1.8 (RS) | 50 or less 0 | — | — | — |
| Comparative Example 10 | 1 | F | 1 | 2.3 (AS) | 50 or less 41 | — | — | — |

*[1]Cooling Rate from 800° C. to 500° C.
*[2]Cooling Rate from 800° C. to 600° C.
*[3]Cooling Rate from 600° C. to 400° C.

Further, Table 11 shows the measurements of the torque of the rotational tool of when performing the welding, and the tensile strength obtained by conducting tensile tests on tensile test specimens of the size of #1 specimen specified by JIS Z 3121 which were collected from the obtained joint.

As the torque of the rotational tool is larger, the plastic flowability is lower, and defects occur more easily.

TABLE 11

| | Torque of Rotational Tool (N · m) | Tensile Strength (MPa) |
|---|---|---|
| Example 11 | 95 | 940 |
| Example 12 | 94 | 952 |
| Example 13 | 87 | 934 |
| Example 14 | 85 | 946 |
| Example 15 | 95 | 933 |
| Example 16 | 87 | 1015 |
| Example 17 | 96 | 1014 |
| Example 18 | 91 | 418 |
| Example 19 | 95 | 971 |
| Example 20 | 95 | 990 |
| Comparative Example 6 | — | — |
| Comparative Example 7 | — | — |
| Comparative Example 8 | — | — |
| Comparative Example 9 | — | — |
| Comparative Example 10 | — | — |

Table 11 shows that, in Examples 11 to 20, even when the welding rate is increased to 1000 mm/min, welding can be performed with the torque of the rotational tool of 100 N·m or less, and strength of 85% or more of the tensile strength of the steel sheets which are the base materials, and joints were successfully obtained without defects. Particularly, in Examples 16 and 17 where cooling and re-heating were performed after the welding, strength of 99% or more of the tensile strength of the base material was obtained.

On the other hand, in Comparative Example 6, the rotational tool was damaged during welding and the steel sheets could not be welded. Further, in Comparative Examples 7 to 10, unwelded portions remained and the steel sheets could not be welded, and therefore it was not possible to obtain joints without defects. Therefore, for Comparative Examples 6 to 10, the torque of the rotational tool, and the like were not measured.

The invention claimed is:

1. A friction stir welding method for structural steel comprising:
   inserting a rotational tool into an unwelded portion of steel sheets or plates, the rotational tool comprising a shoulder and a pin disposed on the shoulder and sharing an axis of rotation with the shoulder, at least the shoulder and pin being made of a material harder than the steel sheets or plates as working materials;
   moving the rotational tool in a welding direction while rotating the tool so that the steel sheets or plates are softened by frictional heat generated between the rotational tool and the steel sheets or plates, and a plastic flow is generated by the softened part being stirred by the rotational tool, and the steel sheets or plates are welded; and heating at least one of the steel sheets or plates with a heating unit provided ahead of the rotational tool moving in the welding direction, wherein when a part of the steel sheets or plates with a temperature Ts (° C.) of a surface of the steel sheets or plates satisfying $T_S \geq 0.8 \times T_{A1}$, where $T_{A1}$ is represented by Formula (1), due to the heating is defined as a heating region, a minimum distance between a heating region and the rotational tool in the surface of the steel sheets or plates is equal to or smaller than the diameter of the shoulder of the rotational tool, an area of the heating region in the surface of the steel sheets or plates is equal to or smaller than a cross-sectional area of a maximum diameter part of the pin of the rotational tool, and 60% or more of the area of the heating region is positioned between a welding center line and a straight line parallel to the welding center line, the welding center line being a straight line passing through the axis of rotation of the rotational tool in the surface of the steel sheets or plates and is parallel to the welding direction and the straight line parallel to the welding center line being separated from the welding center line toward an advancing side by a distance corresponding to the maximum radius of the pin of the rotational tool, $$T_{A1}(°\ C.)=723-10.7[\%\ Mn]-16.9[\%\ Ni]+29.1[\%\ Si]+16.9[\%\ Cr]+290[\%\ As]+6.38[\%\ W] \quad (1)$$

wherein the content of the element is in the steel sheets or plates as working materials.

2. The method according to claim 1, wherein, when the maximum depth, from the surface of the steel sheets or plates, of a range in which a temperature $T_D$ (° C.) in the thickness direction of the heating region satisfies $T_D \geq 0.8 \times T_{A1}$, where $T_{A1}$ is represented by Formula (1), is defined as depth D of the heating region, the depth D of the heating region is 30% or more of the thickness t of the steel sheets or plates, $$T_{A1}(°\ C.)=723-10.7[\%\ Mn]-16.9[\%\ Ni]+29.1[\%\ Si]+16.9[\%\ Cr]+290[\%\ As]+6.38[\%\ W] \quad (1)$$

wherein the content of the element is in the steel sheets or plates as working materials.

3. The method according to claim 1, wherein the heating unit is a laser heating device.

4. The method according to claim 1, wherein a rear heating unit is disposed behind the rotational tool moving in the welding direction, and the welded portion of the steel sheets or plates is heated by the rear heating unit.

5. The method according to claim 4, wherein a cooling unit is provided in a position behind the rotational tool and behind the rear heating unit, and the welded portion of the steel sheets or plates is cooled by the cooling unit.

6. The method according to claim 1, wherein a cooling unit is provided behind the rotational tool moving in the welding direction, and the welded portion of the steel sheets or plates is cooled by the cooling unit.

7. The method according to claim 6, wherein a rear heating unit is provided in a position behind the rotational tool moving in the welding direction and behind the cooling unit, and the welded portion of the steel sheets or plates is re-heated by the rear heating unit.

8. A method of manufacturing a joint for structural steel using the friction stir welding method according to claim 1.

9. The method according to claim 2, wherein the heating unit is a laser heating device.

10. The method according to claim 2, wherein a rear heating unit is disposed behind the rotational tool moving in the welding direction, and the welded portion of the steel sheets or plates is heated by the rear heating unit.

11. The method according to claim 3, wherein a rear heating unit is disposed behind the rotational tool moving in the welding direction, and the welded portion of the steel sheets or plates is heated by the rear heating unit.

12. The method according to claim 9, wherein a rear heating unit is disposed behind the rotational tool moving in the welding direction, and the welded portion of the steel sheets or plates is heated by the rear heating unit.

13. The method according to claim 10, wherein a cooling unit is provided in a position behind the rotational tool and behind the rear heating unit, and the welded portion of the steel sheets or plates is cooled by the cooling unit.

14. The method according to claim 11, wherein a cooling unit is provided in a position behind the rotational tool and behind the rear heating unit, and the welded portion of the steel sheets or plates is cooled by the cooling unit.

15. The method according to claim 12, wherein a cooling unit is provided in a position behind the rotational tool and behind the rear heating unit, and the welded portion of the steel sheets or plates is cooled by the cooling unit.

16. The method according to claim 2, wherein a cooling unit is provided behind the rotational tool moving in the welding direction, and the welded portion of the steel sheets or plates is cooled by the cooling unit.

17. The method according to claim 3, wherein a cooling unit is provided behind the rotational tool moving in the welding direction, and the welded portion of the steel sheets or plates is cooled by the cooling unit.

18. The method according to claim 9, wherein a cooling unit is provided behind the rotational tool moving in the welding direction, and the welded portion of the steel sheets or plates is cooled by the cooling unit.

19. The method according to claim 16, wherein a rear heating unit is provided in a position behind the rotational tool moving in the welding direction and behind the cooling unit, and the welded portion of the steel sheets or plates is re-heated by the rear heating unit.

20. The method according to claim 17, wherein a rear heating unit is provided in a position behind the rotational tool moving in the welding direction and behind the cooling unit, and the welded portion of the steel sheets or plates is re-heated by the rear heating unit.

* * * * *